United States Patent
Russell-Falla et al.

(10) Patent No.: US 6,266,664 B1
(45) Date of Patent: Jul. 24, 2001

(54) METHOD FOR SCANNING, ANALYZING AND RATING DIGITAL INFORMATION CONTENT

(75) Inventors: Adrian Peter Russell-Falla; Andrew Bard Hanson, both of Portland, OR (US)

(73) Assignee: Rulespace, Inc., Portland, OR (US)

( * ) Notice: Subject to any disclaimer, the term of this patent is extended or adjusted under 35 U.S.C. 154(b) by 0 days.

(21) Appl. No.: 09/164,940

(22) Filed: Oct. 1, 1998

Related U.S. Application Data

(60) Provisional application No. 60/060,610, filed on Oct. 1, 1997.

(51) Int. Cl.$^7$ .................................................. G06F 17/30
(52) U.S. Cl. .................................. 707/5; 707/9; 707/10; 709/218; 713/201
(58) Field of Search .................................. 707/9, 10, 5, 6, 707/4; 713/200, 201, 202; 709/217, 218, 219; 705/10.37, 9.36–9.38

(56) References Cited

U.S. PATENT DOCUMENTS

| | | | |
|---|---|---|---|
| 5,343,251 | 8/1994 | Nafeh | 348/571 |
| 5,678,041 | 10/1997 | Baker et al. | 395/609 |
| 5,696,898 | 12/1997 | Baker et al. | 395/187.01 |
| 5,706,507 | 1/1998 | Schloss | 395/615 |
| 5,832,212 | 11/1998 | Cragun et al. | 395/188.01 |
| 5,911,043 | 6/1999 | Duffy et al. | 395/200.33 |
| 5,996,011 | * 11/1999 | Humes | 706/225 |
| 6,009,410 | * 12/1999 | LeMole et al. | 705/14 |

OTHER PUBLICATIONS

"Categorizing Web Documents using Competitive Learning: An Ingredient of a Personal Adaptive Agent," Khan et al., Proceedings of the 1997 International Conference on Neural Networks, vol. 1, pp. 96–99, May 1997.*

\* cited by examiner

Primary Examiner—Hosain T. Alam
(74) Attorney, Agent, or Firm—Columbia IP Law Group, LLC

(57) ABSTRACT

Computer-implemented methods are described for, first, characterizing a specific category of information content—pornography, for example—and then accurately identifying instances of that category of content within a real-time media stream, such as a web page, e-mail or other digital dataset. This content-recognition technology enables a new class of highly scalable applications to manage such content, including filtering, classifying, prioritizing, tracking, etc. An illustrative application of the invention is a software product for use in conjunction with web-browser client software for screening access to web pages that contain pornography or other potentially harmful or offensive content. A target attribute set of regular expression, such as natural language words and/or phrases, is formed by statistical analysis of a number of samples of datasets characterized as "containing," and another set of samples characterized as "not containing," the selected category of information content. This list of expressions is refined by applying correlation analysis to the samples or "training data." Neural-network feed-forward techniques are then applied, again using a substantial training dataset, for adaptively assigning relative weights to each of the expressions in the target attribute set, thereby forming an awaited list that is highly predictive of the information content category of interest.

30 Claims, 4 Drawing Sheets

METHOD FOR SCANNING, ANALYZING AND RATING DIGITAL INFORMATION CONTENT

RELATED APPLICATION DATA

This application is a continuation of Ser. No. 60/060,610 filed Oct. 1, 1997 and incorporated herein by this reference.

COMPUTER PROGRAM LISTING APPENDIX

This specification includes a computer program appendix listing containing four source code files. They are:

| File Size (Bytes) | Creation Date | File Name |
| --- | --- | --- |
| 27,711 | 03-16-01 | proxyinterface.cpp |
| 1,578 | 03-16-01 | proxyinterface.h |
| 27,388 | 03-16-01 | regincludes.c |
| 938 | 03-16-01 | regincludes.h |

This listing forms part of the disclosure of the application.

TECHNICAL FIELD

The present invention pertains to methods for scanning and analyzing various kinds of digital information content, including information contained in web pages, email and other types of digital datasets, including multi-media datasets, for detecting specific types of content. As one example, the present invention can be embodied in software for use in conjunction with web browsing software to enable parents and guardians to exercise control over what web pages can be downloaded and viewed by their children.

BACKGROUND OF THE INVENTION

Users of the World-Wide Web ("Web") have discovered the benefits of simple, low-cost global access to a vast and exponentially growing repository of information, on a huge range of topics. Though the Web is also a delivery medium for interactive computerized applications (such as online airline travel booking systems), a major part of its function is the delivery of information in response to a user's inquiries and ad-hoc exploration—process known popularly as "surfing the Web."

The content delivered via the Web is logically and semantically organized as "pages"—autonomous collections of data delivered as a package upon request. Web pages typically use the HTML language as a core syntax, though other delivery syntaxes are available.

Web pages consist of a regular structure, delineated by alphanumeric commands in HTML, plus potentially included media elements (pictures, movies, sound files, Java programs, etc.). Media elements are usually technically difficult or time-consuming to analyze.

Pages were originally grouped and structured on Web sites for publication; recently, other forms of digital data, such as computer system file directors, have also been made accessible to Web browsing software on both a local and shared basis.

Another discrete organization of information which is analogous to the Web page is an individual email document. The present invention can be applied to analyzing email content as explained later.

The participants in the Web delivery system can be categorized as publishers, who use server software and hardware systems to provide interactive Web pages, and end-users, who use web-browsing client software to access this information. The Internet, tying together computer systems worldwide via interconnected international data networks, enables a global population of the latter to access information made available by the former. In the case of information stored on a local computer system, the publisher and end-user may clearly be the same person—but given shared use of computing resources, this is not always so.

The technologies originally developed for the Web are also being increasingly applied to the local context of the personal computer environment, with Web-browsing software capable of viewing and operating on local files. This patent application is primarily focused on the Web-based environment, but also envisions the applicability of many of the petitioners' techniques to information bound to the desktop context.

End-users of the Web can easily access many dozens of pages during a single session. Following links from search engines, or from serendipitous clicking of the Web links typically bound within Web pages by their authors, users cannot anticipate what information they will next be seeing.

The data encountered by end-users surfing the Web takes many forms. Many parents are concerned about the risk of their children encountering pornographic material online. Such material is widespread. Other forms of content available over the Web create similar concern, including racist material and hate-mongering, information about terrorism and terrorist techniques, promotion of illicit drugs, and so forth. Some users may not be concerned about protecting their children, but rather simply wish themselves not to be inadvertently exposed to offensive content. Other persons have managerial or custodial responsibility for the material accessed or retrieved by others, such as employees; liability concerns often arise from such access.

SUMMARY OF THE INVENTION

In view of the foregoing background, one object of the present invention is to enable parents or guardians to exercise some control over the web page content displayed to their children.

Another object of the invention is to provide for automatic screening of web pages or other digital content.

A further object of the invention is to provide for automatic blocking of web pages that likely include pornographic or other offensive content.

A more general object of the invention is to characterize a specific category of information content by example, and then to efficiently and accurately identify instances of that category within a real-time datastream.

A further object of the invention is to support filtering, classifying, tracking and other applications based on real-time identification of instances of particular selected categories of content—with or without displaying that content.

The invention is useful for a variety of applications, including but not limited to blocking digital content, especially world-wide web pages, from being displayed when the content is unsuitable or potentially harmful to the user, or for any other reason that one might want to identify particular web pages based on their content.

According to one aspect of the invention, a method for controlling access to potentially offensive or harmful web pages includes the following steps: First, in conjunction with a web browser client program executing on a digital computer, examining a downloaded web page before the web page is displayed to the user. This examining step includes identifying and analyzing the web page natural language content relative to a predetermined database of words—or more broadly regular expressions—to form a rating. The database or "weighting list" includes a list of expressions previously associated with potentially offensive or harmful web pages, for example pornographic pages, and the database includes a relative weighting assigned to each word in the list for use in forming the rating.

The next step is comparing the rating of the downloaded web page to a predetermined threshold rating. The threshold rating can be by default, or can be selected, for example based on the age or maturity of the user, or other "categorization" of the user, as indicated by a parent or other administrator. If the rating indicates that the downloaded web page is more likely to be offensive or harmful than a web page having the threshold rating, the method calls for blocking the downloaded web page from being displayed to the user. In a presently preferred embodiment, if the downloaded web page is blocked, the method further calls for displaying an alternative web page to the user. The alternative web page can be generated or selected responsive to a predetermined categorization of the user like the threshold rating. The alternative web page displayed preferably includes an indication of the reason that the downloaded web page was blocked, and it can also include one or more links to other web pages selected as age-appropriate in view of the categorization of the user. User login and password procedures are used to establish the appropriate protection settings.

Of course the invention is fully applicable to digital records or datasets other than web pages, for example files, directories and email messages. Screening pornographic web pages is described to illustrate the invention and it reflects a commercially available embodiment of the invention.

Another aspect of the invention is a computer program. It includes first means for identifying natural language textual portions of a web page and forming a list of words or other regular expressions that appear in the web page; a database of predetermined words that are associated with the selected characteristic; second means for querying the database to determine which of the list of words has a match in the database; third means for acquiring a corresponding weight from the database for each such word having a match in the database so as to form a weighted set of terms; and fourth means for calculating a rating for the web page responsive to the weighted set of terms, the calculating means including means for determining and taking into account a total number of natural language words that appear in the identified natural language textual portions of the web page.

As alluded to above, statistical analysis of a web page according to the invention requires a database or attribute set, compiled from words that appear in know "bad"—e.g. pornographic, hate-mongering, racist, terrorist, etc.—web pages. The appearance of such words in a downloaded page under examination does not necessarily indicate that the page is "bad", but it increases the probability that such is the case. The statistical analysis requires a "weighting" be provided for each word or phrase in a word list. The weightings are relative to some neutral value so the absolute values are unimportant. Preferably, positive weightings are assigned to words or phrases that are more likely to (or even uniquely) appear in the selected type of page such as a pornographic page, while negative weightings are assigned to words or phrases that appear in non-pornographic pages. Thus, when the weightings are summed in calculating a rating of a page, the higher the value the more likely the page meets the selected criterion. If the rating exceeds a selected threshold, the page can be blocked.

A further aspect of the invention is directed to building a database or target attribute set. Briefly, a set of "training datasets" such as web pages are analyzed to form a list of regular expressions. Pages selected as "good" (non-pornographic, for example) and pages selected as "bad" (pornographic) are analyzed, and rate of occurrence data is statistically analyzed to identify the expressions (e.g. natural language words or phrases) that are helpful in discriminating the content to be recognized. These expressions form the target attribute set.

Then, a neural network approach is used to assign weightings to each of the listed expressions. This process uses the experience of thousands of examples, like web pages, which are manually designated simply as "yes" or "no" as further explained later.

Additional objects and advantages of this invention will be apparent from the following detailed description of preferred embodiments thereof which proceeds with reference to the accompanying drawings.

DETAILED DESCRIPTION OF A PREFERRED EMBODIMENT

Figure 1:
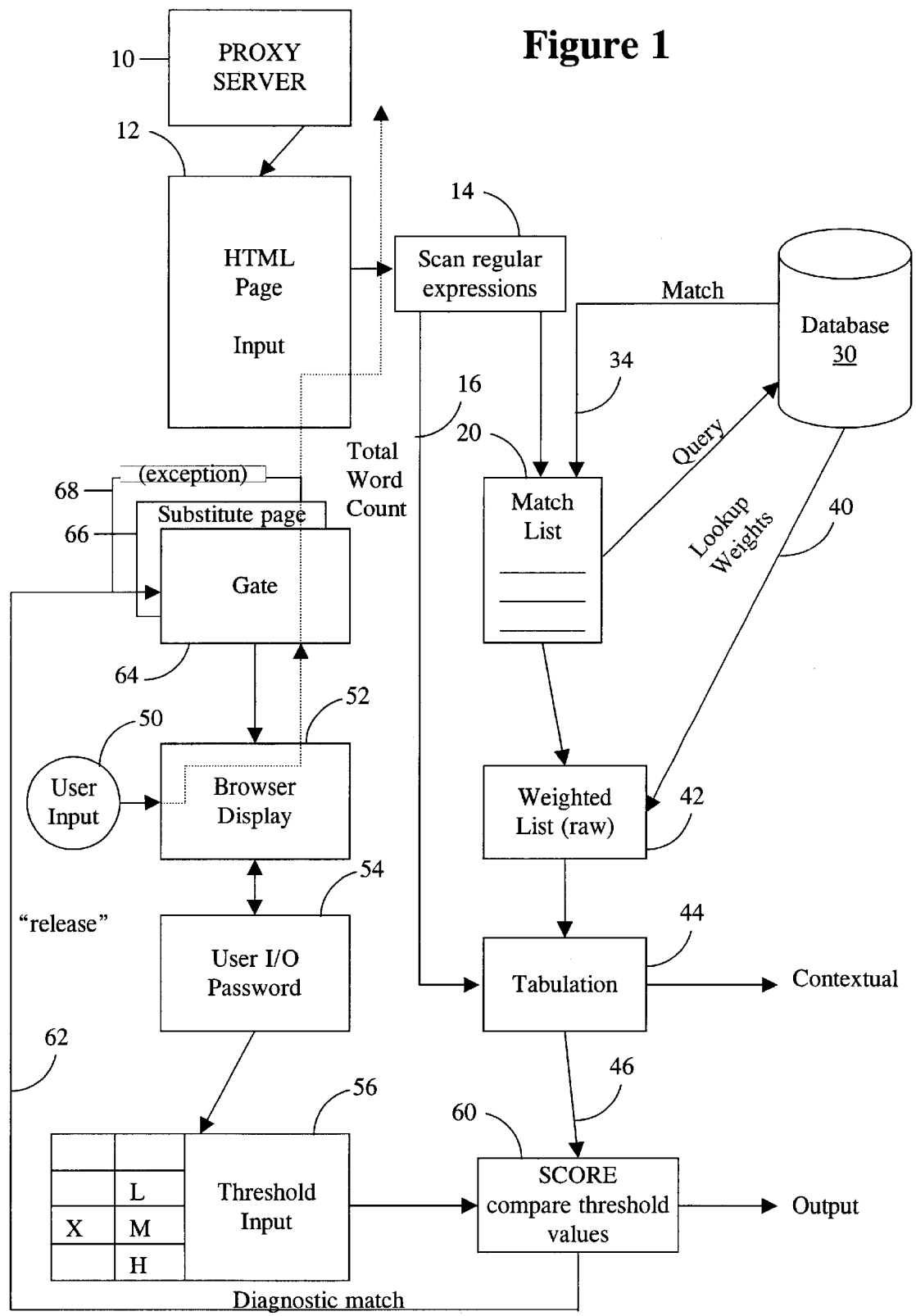
FIG. 1 is a flow diagram illustrating operation of a process according to the present invention for blocking display of a web page or other digital dataset that contains a particular type of content such as pornography.

FIG. 1 is a flow diagram illustrating operation of a process for blocking display of a web page (or other digital record) that contains a particular type of content. As will become apparent from the following description, the methods and techniques of the present invention can be applied for analyzing web pages to detect any specific type of selected content. For example, the invention could be applied to detect content about a particular religion or a particular book; it can be used to detect web pages that contain neo-Nazi propaganda; it can be used to detect web pages that contain racist content, etc. The presently preferred embodiment and the commercial embodiment of the invention are directed to detecting pornographic content of web pages. The following discussions will focus on analyzing and detecting pornographic content for the purpose of illustrating the invention.

In one embodiment, the invention is incorporated into a computer program for use in conjunction with a web browser client program for the purpose of rating web pages relative to a selected characteristic—pornographic content, for example—and potentially blocking display of that web page on the user's computer if the content is determined pornographic. In FIG. 1, the software includes a proxy server 10 that works upstream of and in cooperation with the web browser software to receive a web page and analyze it before it is displayed on the user's display screen. The proxy server thus provides an HTML page 12 as input for analysis. The first analysis step 14 calls for scanning the page to identify the regular expressions, such as natural language textual portions of the page. For each expression, the software queries a pre-existing database 30 to determine whether or not the expression appears in the database. The database 30, further described later, comprises expressions that are useful in discriminating a specific category of information such as pornography. This query is illustrated in FIG. 1 by flow path 32, and the result, indicating a match or no match, is shown at path 34. The result is formation of a "match list" 20 containing all expressions in the page 12 that also appear in the database 30. For each expression in the match list, the software reads a corresponding weight from the database 30, step 40, and uses this information, together with the match list 20, to form a weighted list of expressions 42. This weighted list of terms is tabulated in step 44 to determine a score or rating in accordance with the following formula:

$$\text{rating} = \left( n \sum_{1}^{p} (x_p w_p) \right) / c$$

In the above formula, "n" is a modifier or scale factor which can be provided based on user history. Each term $x_p$ $w_p$ is one of the terms from the weighted list 42. As shown in the formula, these terms are summed together in the tabulation step 44, and the resulting sum is divided by a total word count provided via path 16 from the initial page scanning step 14. The total score or rating is provided as an output at 46.

Turning now to operation of the program from the end-user's perspective, again referring to FIG. 1, the user interacts with a conventional web browser program by providing user input 50. Examples of well-known web-browser programs include Microsoft Internet Explorer and Netscape. The browser displays information through the browser display or window 52, such as a conventional PC monitor screen. When the user launches the browser program, the user logs-in for present purposes by providing a password at step 54. The user I.D. and password are used to look up applicable threshold values in step 56.

In general, threshold values are used to influence the decision of whether or not a particular digital dataset should be deemed to contain the selected category of information content. In the example at hand, threshold values are used in the determination of whether or not any particular web page should be blocked or, conversely, displayed to the user. The software can simply select a default threshold value that is thought to be reasonable for screening pornography from the average user. In a preferred embodiment, the software includes means for a parent, guardian or other administrator to set up one or more user accounts and select appropriate threshold values for each user. Typically, these will be based on the user's age, maturity, level of experience and the administrator's good judgment. The interface can be relatively simple, calling for a selection of a screening level—such as low, medium and high—or user age groups. The software can then translate these selections into corresponding rating numbers.

Operation

In operation, the user first logs-in with a user I.D. and password, as noted, and then interacts with the browser software in the conventional manner to "surf the web" or access any selected web site or page, for example, using a search engine or a predetermined URL. When a target page is downloaded to the user's computer, it is essentially "intercepted" by the proxy server 10, and the HTML page 12 is then analyzed as described above, to determine a rating score shown at path 46 in FIG. 1. In step 60, the software then compares the downloaded page rating to the threshold values applicable to the present user. In a preferred embodiment, the higher the rating the more likely the page contains pornographic content. In other words, a higher frequency of occurrence of "naughty" words (those with positive weights) drives the ratings score higher in a positive direction. Conversely, the presence of other terms having negative weights drives the score lower.

If the rating of the present page exceeds the applicable threshold or range of values for the current user, a control signal shown at path 62 controls a gate 64 so as to prevent the present page from being displayed at the browser display 52. Optionally, an alternative or substitute page 66 can be displayed to the user in lieu of the downloaded web page. The alternative web page can be a single, fixed page of content stored in the software. Preferably, two or more alternative web pages are available, and an age-appropriate alternative web page is selected, based on the user I.D. and threshold values. The alternative web page can explain why the downloaded web page has been blocked, and it can provide links to direct the user to web pages having more appropriate content. The control signal 62 could also be used to take any other action based on the detection of a pornographic page, such as sending notification to the administrator. The administrator can review the page and, essentially, overrule the software by adding the URL to a "do not block" list maintained by the software.

Formulating Weighted Lists of Words and Phrases

Figure 2:
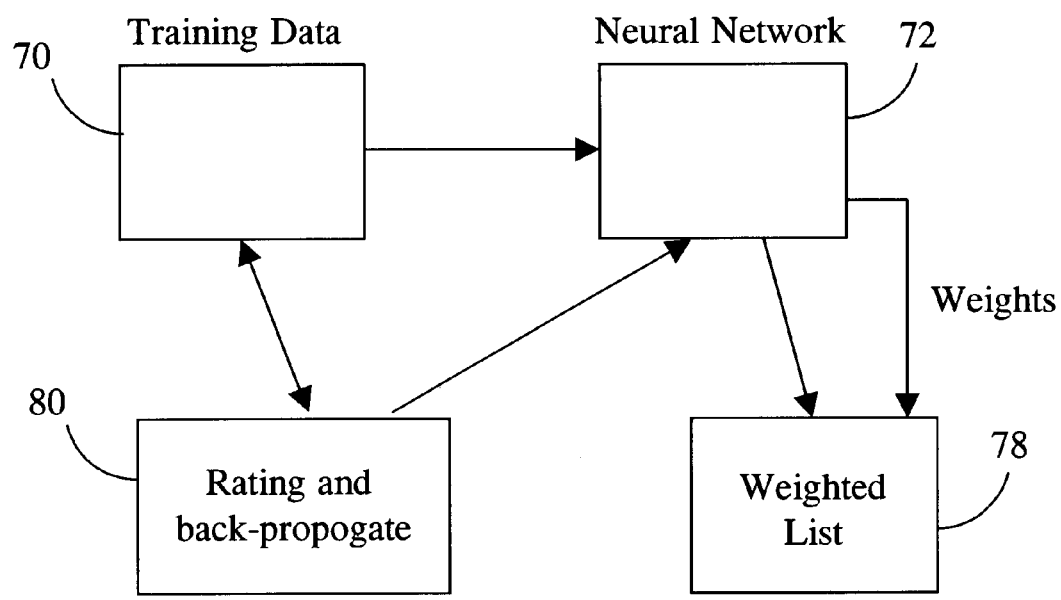
FIG. 2 is a simplified block diagram of a modified neural network architecture for creating a weighted list of regular expressions useful in analyzing content of a digital dataset.

FIG. 2 is a simplified block diagram of a neural-network architecture for developing lists of words and weightings according to the present invention. Here, training data 70 can be any digital record or dataset, such as database records, e-mails, HTML or other web pages, use-net postings, etc. In each of these cases, the records include at least some text, i.e., strings of ASCII characters, that can be identified to form regular expressions, words or phrases. We illustrate the invention by describing in greater detail its application for detecting pornographic content of web pages. This description should be sufficient for one skilled in the art to apply the principles of the invention to other types of digital information.

In FIG. 2, a simplified block diagram of a neural-network shows training data 70, such as a collection of web pages. A series of words, phrases or other regular expressions is extracted from each web page and input to a neural-network 72. Each of the terms in the list is initially assigned a weight at random, reflected in a weighted list 78. The network analyzes the content of the training data, as further explained below, using the initial weighting values. The resulting ratings are compared to the predetermined designation of each sample as "yes" or "no," i.e., pornographic or not pornographic, and error data is accumulated. The error information thus accumulated over a large set of training data, say 10,000 web pages, is then used to incrementally adjust the weightings. This process is repeated in an interactive fashion to arrive at a set of weightings that are highly predictive of the selected type of content.

Figure 3:
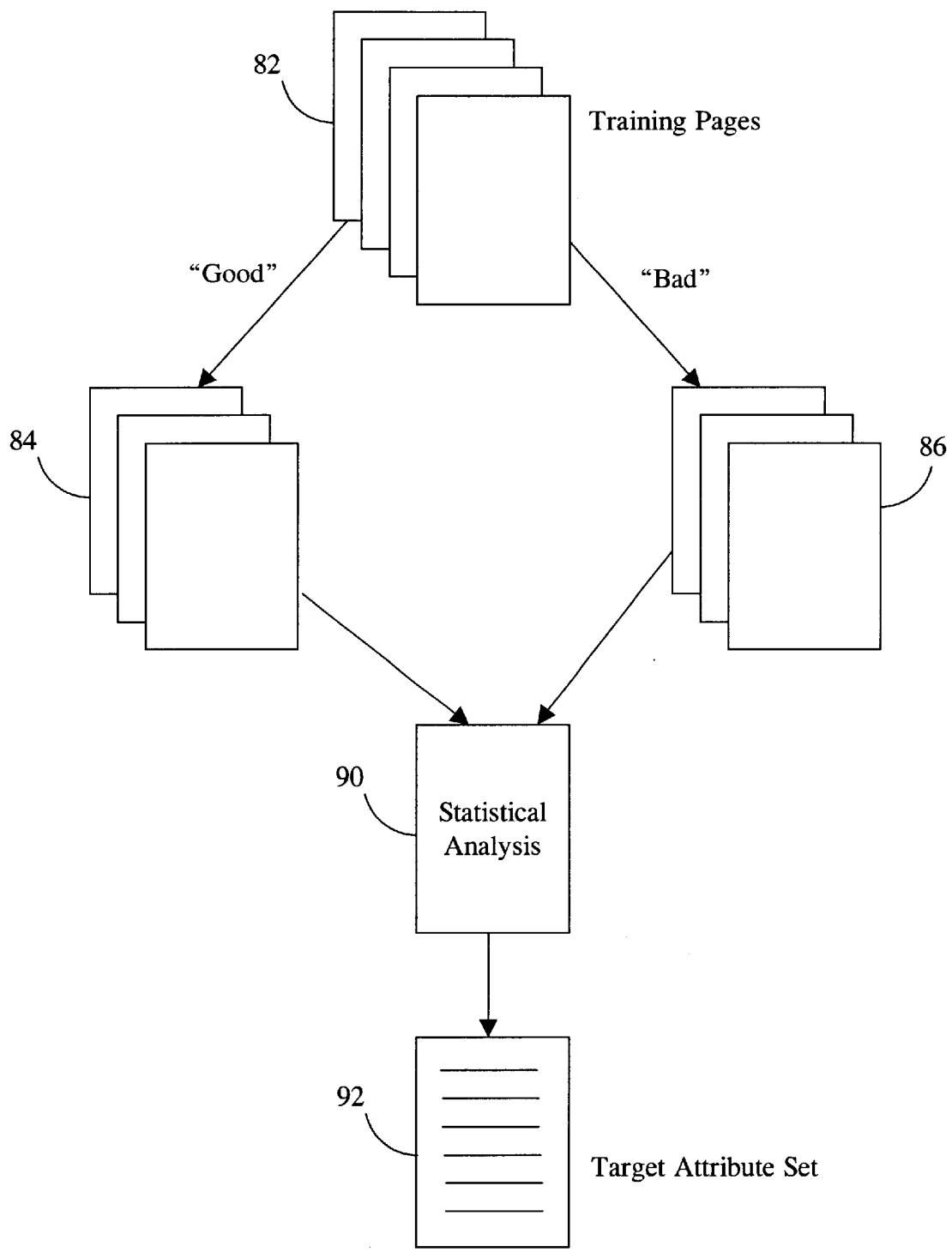
FIG. 3 is a simplified diagram illustrating a process for forming a target attribute set having terms that are indicative of a particular type of content, based on a group of training datasets.

FIG. 3 is a flow diagram that illustrates the process for formulating weighted lists of expressions—also called target attribute set—in greater detail. Referring to FIG. 3, a collection of "training pages" 82 is assembled which, again, can be any type of digital content that includes ASCII words but for illustration is identified as a web page. The "training" process for developing a weighted list of terms requires a substantial number of samples or "training pages" in the illustrated embodiment. As the number of training pages increases, the accuracy of the weighting data improves, but the processing time for the training process increases non-linearly. A reasonable tradeoff, therefore, must be selected, and the inventors have found in the presently preferred embodiment that the number of training pages (web pages) used for this purpose should be at least about 10 times the size of the word list. Since a typical web page contains on the order of 1,000 natural language words, a useful quantity of training pages is on the order of 10,000 web pages.

Five thousand web pages 84 should be selected as examples of "good" (i.e., not pornographic) content and another 5,000 web pages 86 selected to exemplify "bad" (i.e., pornographic) content The next step in the process is to create, for each training page, a list of unique words and phrases (regular expressions). Data reflecting the frequency of occurrence of each such expression in the training pages is statistically analyzed 90 in order to identify those expressions that are useful for discriminating the pertinent type of content. Thus, the target attribute set is a set of attributes that are indicative of a particular type of content, as well as attributes that indicate the content is NOT of the target type. These attributes are then ranked in order of frequency of appearance in the "good" pages and the "bad" pages.

The attributes are also submitted to a Correlation Engine which searches for correlations between attributes across content sets. For example, the word "breast" appears in both content sets, but the phrases "chicken breast" and "breast cancer" appear only in the Anti-Target ("good") Content Set. Attributes that appear frequently in both sets without a mitigating correlation are discarded. The remaining attributes constitute the Target Attribute Set.

Figure 4:
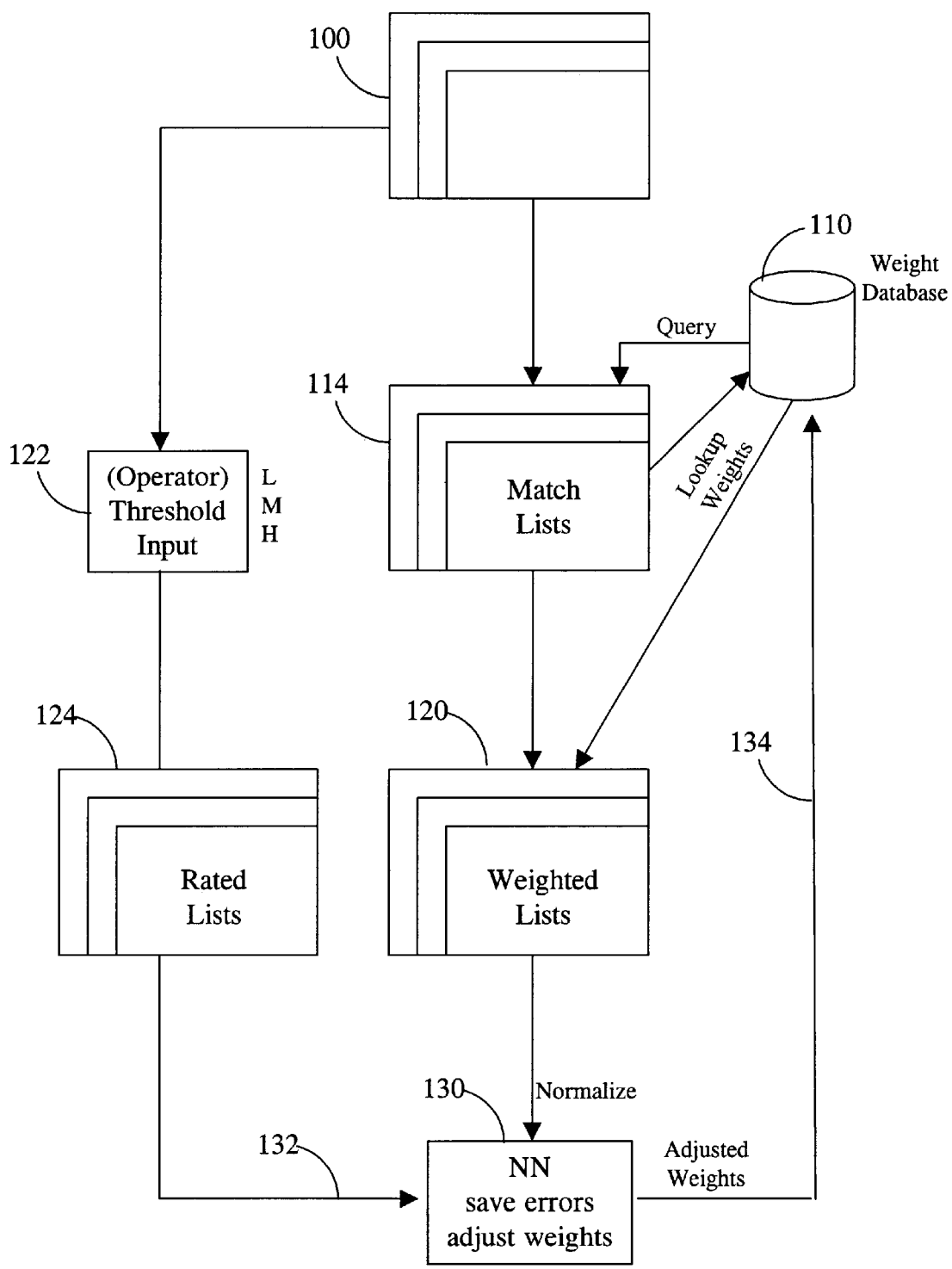
FIG. 4 is a flow diagram illustrating a neural network based adaptive training process for developing a weighted list of terms useful for analyzing content of web pages or other digital datasets.

FIG. 4 illustrates a process for assigning weights to the target attribute set, based on the training data discussed above. In FIG. 4, the weight database 110 essentially comprises the target attribute set of expressions, together with a weight value assigned to each expression or term. Initially, to begin the adaptive training process, these weights are random values. (Techniques are known in computer science for generating random—or at least good quality, pseudo-random—numbers.) These weighting values will be adjusted as described below, and the final values are stored in the database for inclusion in a software product implementation of the invention. Updated or different weighting databases can be provided, for example via the web.

The process for developing appropriate weightings proceeds as follows. For each training page, similar to FIG. 1, the page is scanned to identify regular expressions, and these are checked against the database 110 to form a match list 114. For the expressions that have a match in database 110, the corresponding weight is downloaded from the database and combined with the list of expressions to form a weighted list 120. This process is repeated so that weighted lists 120 are formed for all of the training pages 100 in a given set.

Next, a threshold value is selected—for example, low, medium or high value—corresponding to various levels of selectivity. For example, if a relatively low threshold value is used, the system will be more conservative and, consequently, will block more pages as having potentially pornographic content. This may be useful for young children, even though some non-pornographic pages may be excluded. Based upon the selected threshold level 122, each of the training pages 100 is designated as simply "good" or "bad" for training purposes. This information is stored in the rated lists at 124 in FIG. 4 for each of the training pages.

A neural-network 130 receives the page ratings (good or bad) via path 132 from the lists 124 and weighted lists 120. It also accesses the weight database 110. The neural-network then executes a series of equations for analyzing the entire set of training pages (for example, 10,000 web pages) using the set of weightings (database 110) which initially are set to random values. The network processes this data and takes into account the correct answer for each page—good or bad—from the list 124 and determines an error value. This error term is then applied to adjust the list of weights, incrementally up or down, in the direction that will improve the accuracy of the rating. This is known as a feed-forward or back-propagation technique, indicated at path 134 in the drawing. This type of neural-network training arrangement is known in prior art for other applications. For example, a neural-network software packaged called "SNNS" is available on the internet for downloading from the University of Stuttgart.

Following are a few entries from a list of regular expressions along with neural-net assigned weights:

| | |
|---|---|
| 18[\W]?years[\W]?of[\W]?age[\W] | 500 |
| adults[\W]?only[\W] | 500 |
| bestiality[\W] | 250 |
| chicken[\W]breasts?[\W] | −500 |
| sexually[\W]?(oriented\|explicit)[\W] | 500 |

Other Applications

As mentioned above, the principles of the present invention can be applied to various applications other than web-browser client software. For example, the present technology can be implemented as a software product for personal computers to automatically detect and act upon the content of web pages as they are viewed and automatically "file," i.e., create records comprising meta-content references to that web-page content in a user-modifiable, organizational and presentation schema.

Another application of the invention is implementation in a software product for automatically detecting and acting upon the content of computer files and directories. The software can be arranged to automatically create and record meta-content references to such files and directories in a user-modifiable, organizational and presentation schema. Thus, the technology can be applied to help end users quickly locate files and directories more effectively and efficiently than conventional directory-name and key-word searching.

Another application of the invention is e-mail client software for controlling pornographic and other potentially harmful or undesired content and e-mail. In this application, a computer program for personal computers is arranged to automatically detect and act upon e-mail content—for example, pornographic e-mails or unwanted commercial solicitations. The program can take actions as appropriate in response to the content, such as deleting the e-mail or responding to the sender with a request that the user's name be deleted from the mailing list.

The present invention can also be applied to e-mail client software for categorizing and organizing information for convenient retrieval. Thus, the system can be applied to automatically detect and act upon the content of e-mails as they are viewed and automatically file meta-content references to the content of such e-mails, preferably in a user-modifiable, organizational and presentation schema.

A further application of the invention for controlling pornographic or other undesired content appearing in UseNet news group postings and, like e-mail, the principles of the present invention can be applied to a software product for automatically detecting and acting upon the content of UseNet postings as they are received and automatically filing meta-content references to the UseNet postings in a user-modifiable, organizational and presentation schema.

It will be obvious to those having skill in the art that many changes may be made to the details of the above-described embodiment of this invention without departing from the underlying principles thereof. The scope of the present invention should, therefore, be determined only by the following claims.

What is claimed is:

1. A computer-readable medium storing a computer program for use in conjunction with a web browser client program to rate a web page relative to a selected characteristic, the program comprising:

first means for identifying natural language textual portions of the web page and forming a list of words that appear in the identified natural language textual portions of the web page;

a database of predetermined words that are associated with the selected characteristic;

second means for acquiring a corresponding weight from the database for each such word having a match in the database so as to form a weighted set of terms; and neural network means for calculating a rating for the web page responsive to the weighted set of terms, the neural network means including means for determining and taking into account a total number of natural language words that appear in the identified natural language textual portions of the web page.

2. A computer-readable medium storing a computer program for use in conjunction with a web browser client program to rate a web page according to claim 1 wherein the selected characteristic is pornographic content; and the database includes a predetermined a list of words and phrases that are associated with web pages having pornographic content.

3. A computer-readable medium storing a computer program for use in conjunction with a web browser client program to rate a web page according to claim 1 and further comprising means for storing a predetermined threshold rating, and means for comparing the calculated rating to the threshold rating to determine whether the web page likely has the selected characteristic.

4. A computer-readable medium storing a computer program for use in conjunction with a web browser client program to rate a web page according to claim 1 wherein the selected characteristic is hate-mongering content; and the database includes a predetermined a list of words and phrases that are associated with web pages having hate-mongering content.

5. A computer-readable medium storing a computer program for use in conjunction with a web browser client program to rate a web page according to claim 1 wherein the selected characteristic is racist content; and the database includes a predetermined a list of words and phrases that are associated with web pages having racist content.

6. A computer-readable medium storing a computer program for use in conjunction with a web browser client program to rate a web page according to claim 1 wherein the selected characteristic is terrorist content; and the database includes a predetermined a list of words and phrases that are associated with web pages having terrorist content.

7. A computer-readable medium storing a computer program for use in conjunction with a web browser client program to rate a web page according to claim 1 wherein the selected characteristic is neo-Nazi content; and the database includes a predetermined a list of words and phrases that are associated with web pages having neo-Nazi content.

8. A computer-readable medium storing a computer program for use in conjunction with a web browser client program to rate a web page according to claim 1 wherein the selected characteristic is illicit drugs content; and the database includes a predetermined a list of words and phrases that are associated with web pages having content pertaining to illicit drugs.

9. A computer-readable medium storing a computer program for use in conjunction with a web browser client program to rate a web page according to claim 1 wherein the selected characteristic is content selected as presenting a liability risk to persons having managerial responsibility for the web page material accessed by others; and the database includes a predetermined a list of words and phrases that are associated with web pages having content likely to present a liability risk to persons having managerial responsibility for the web page material accessed by others.

10. A method of analyzing content of a web page, the method comprising:

identifying natural language textual portions of the web page;

forming a word listing including all natural language words that appear in the textual portion of the web page;

for each word in the word list, querying a preexisting database of selected words to determine whether or not a match exists in the database;

for each word having a match in the database, reading a corresponding weight from the database so as to form a weighted set of terms; and in a neural network system, calculating a rating for the web page responsive to the weighted set of terms.

11. A method according to claim 10 wherein the method further comprises:

identifying meta-content in the web page; and identifying words from the meta-content of the web page in the word list so that the meta-content is taken into account in calculating the rating for the web page.

12. A method according to claim 10 wherein said calculating step includes:

summing the weighted set of terms together to form a sum;

multiplying the sum by a predetermined modifier to scale the sum;

determining a total number of words on the web page; and dividing the scaled sum by the total number of words on the web page to form the rating.

13. A method according to claim 10 wherein the preexisting database comprises words selected as indicative of pornographic content.

14. A method according to claim 10 wherein the preexisting database comprises words selected as indicative of hate-mongering content.

15. A method according to claim 10 wherein the preexisting database comprises words selected as indicative of racist content.

16. A method according to claim 10 wherein the preexisting database comprises words selected as indicative of terrorist content.

17. A method according to claim 10 wherein the preexisting database comprises words selected as indicative of neo-Nazi content.

18. A method according to claim 10 wherein the preexisting database comprises words selected as indicative content pertaining to illicit drugs.

19. A method of building a target attribute set for use in analyzing content of a web page, the method comprising:

acquiring a plurality of sample web pages for use as training web pages;

designating each of the training data sets as "yes" or "no" with respect to a predetermined content characteristic;

parsing through the content of all the training web pages to form a list of regular expressions that appear in the training web pages;

forming data reflecting a frequency of occurrence of each regular expression in the training web pages;

analyzing the frequency of occurrence data, in view of the "yes' or "no' designation of each web page, to identify and select a set of regular expressions that are indicative of either a "yes' designation or a "no" designation of a web page with respect to the predetermined characteristic; and storing the selected set of regular expressions to form a target attribute set based on the acquired training web pages, whereby the target attribute set provides a set of regular expressions that are useful in a neural network system in discriminating web page content relative to the predetermined content characteristic.

20. A method of assigning weights to a list of regular expressions for use in analyzing content of a web page, the method comprising:

providing a predetermined target attribute set associated with a predetermined group of training web pages, the target attribute set including a list of regular expressions that are deemed useful in a neural network system for discriminating web page content relative to a predetermined content characteristic;

assigning an initial weight to each of the regular expressions in the target attribute set, thereby forming a weight database;

designating each of the group of training web pages as either "yes" or "no" relative to whether it exhibits the predetermined content characteristic;

examining one of the group of training web pages to identify all regular expressions within the web page that also appear in the target attribute set, thereby forming a match list for said web page;

in a neural network system, rating the examined web page using the weightings in the weight database;

comparing the rating the examined web page to the corresponding "yes" or "no" designation to form a first error term;

repeating said examining, rating and comparing operations for each of the remaining web pages in the group of training web pages to form additional error terms; and adjusting the weights in the weight database in response to the first and the additional error terms.

21. A method of assigning weights according to claim 20 wherein the predetermined content characteristic is pornography.

22. A method of controlling access to potentially offensive or harmful web pages comprising:

in conjunction with a web browser client program executing on a digital computer, examining a downloaded web page before the web page is displayed to the user; said examining operation including analyzing the web page natural language content relative to a predetermined database of regular expressions, and using a neural network system to form a rating, the database including regular expressions previously associated with potentially offensive or harmful web pages; and the database further including a relative weighting associated with each regular expression in the database for use in forming the rating;

comparing the rating of the downloaded web page to a predetermined threshold rating; and if the rating indicated that the downloaded web page is more likely to be offensive or harmful than a web page having the threshold rating, blocking the downloaded web page from being displayed to the user.

23. A method according to claim 22 further comprising:

if the downloaded web page is blocked, displaying an alternative web page to the user.

24. A method according to claim 23 wherein said displaying an alternative web page includes generating or selecting the alternative web page responsive to a predetermined categorization of the user.

25. A method according to claim 23 wherein the alternative web page includes an indication of the reason that the downloaded web page was blocked.

26. A method according to claim 22 wherein the alternative web page includes one or more links to other web pages selected as age-appropriate in view of a predetermined categorization of the user.

27. A computer-readable medium storing a web search engine server program, the program comprising:

a data acquisition component for acquiring meta-content from target web sites into an internal database; and an inquiry component for selecting and presenting meta-content from the internal database in response to an end-user request;

the data acquisition component including an analysis component that analyzes the content of web pages corresponding to the meta-content stored in the internal database, and a neural network subsystem that returns a rating for each such web page based on the result of said analysis; and means for adding said returned ratings into the internal database as additional meta-content in association with the corresponding web pages.

28. A computer-readable medium storing a web search engine server program according to claim 27, the analysis component including:

first means for identifying natural language textual portions of the web page and forming a list of words that appear in the identified natural language textual portions of the web page;

a second internal database of predetermined words that are associated with the selected characteristic;

second means for querying the second internal database to determine which of the list of words has a match in the database;

third means for acquiring a corresponding weight from the second internal database for each such word having a match in the second internal database so as to form a weighted set of terms; and fourth means for calculating a rating for the web page responsive to the weighted set of terms, the calculating means including means for determining and taking into account a total number of natural language words that appear in the identified natural language textual portions of the web page.

29. A computer-readable medium storing a web search engine server program according to claim 27, and further comprising means for including the additional meta-content in said presenting meta-content from the internal database in response to an end-user request.

30. A computer-readable medium storing a web search engine server program according to claim 27, and further comprising means for modifying the meta-content results presented in response to an end-user request based upon the said ratings.

* * * * *